Feb. 26, 1929.

C. J. WHITACRE ET AL 1,703,650

CLUTCH

Filed May 20, 1926 2 Sheets-Sheet 1

Inventors
Clarence J. Whitacre
& Albert G. Gislert
By their
Blackmore, Spencer & Hulit,
Attorneys Feb. 26, 1929.
C. J. WHITACRE ET AL
1,703,650
CLUTCH
Filed May 20, 1926  2 Sheets-Sheet 2
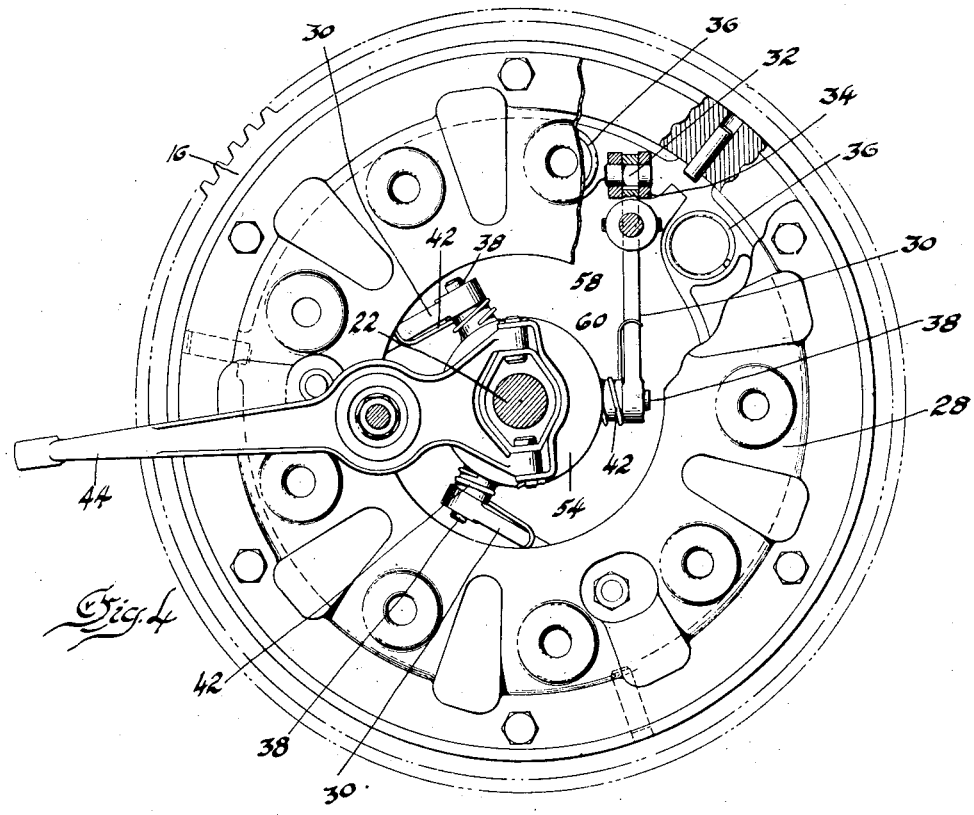
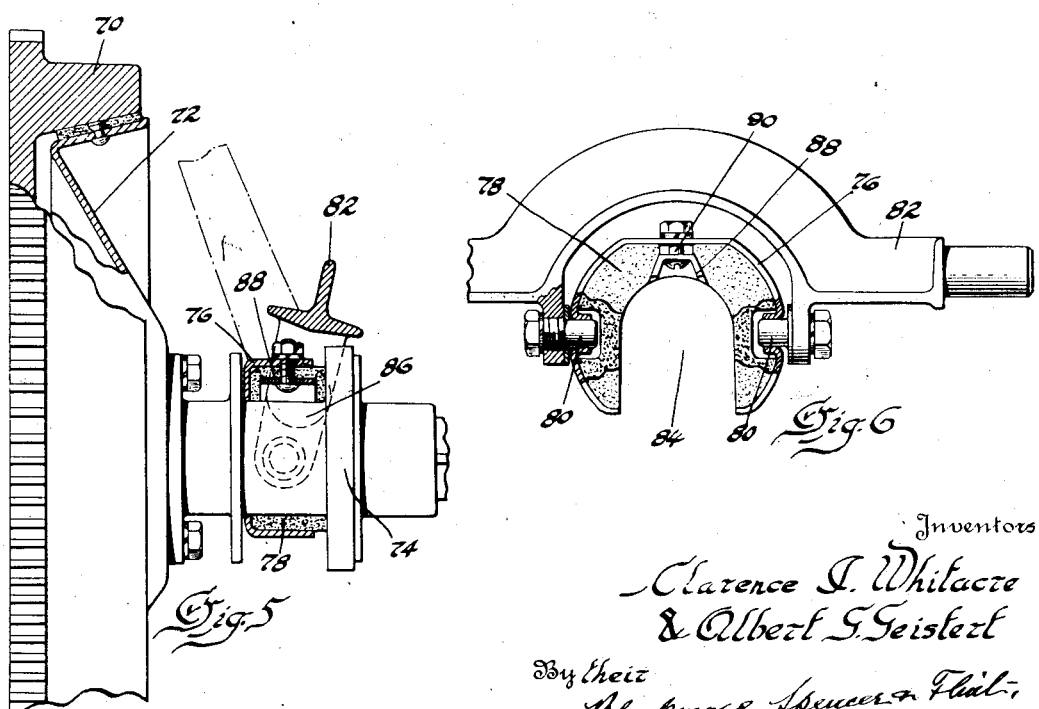
Inventors
Clarence J. Whitacre
& Albert G. Geistert
By their
Blackmore, Spencer & Flint
Attorneys Patented Feb. 26, 1929.

1,703,650

UNITED STATES PATENT OFFICE.

CLARENCE J. WHITACRE, OF FLINT, AND ALBERT G. GEISTERT, OF DETROIT, MICHIGAN.

CLUTCH.

Application filed May 20, 1926. Serial No. 110,443.

This invention relates to clutches, and is illustrated as embodied, in two modifications, in a single plate clutch and in a cone clutch, for an automobile.

This application is filed as a continuation in part of our application for clutches filed May 10, 1924, Serial No. 712,313, and is intended to secure protection on the self lubricating clutch releasing bearing.

An important object of the invention is to secure permanent lubrication of the clutch release or throw out bearing, and if desired of the clutch release lever fulcrum, by the use of a solid material of considerable hardness, so that it will wear practically for the life of the clutch, and having a substantial tensile strength so that it will stand up indefinitely under the shocks and jars received by an automobile clutch. Having this object in view, we arrange the clutch release with a throw out bearing part of solid lubricating material, preferably a heavy compressed and highly heated mixture of graphite and a bonding material, in the form of a rigid block.
If desired, the block may also be impregnated with a heavy lubricating oil or grease.

In one desirable arrangement which is found in practice to be capable of withstanding the roughest kind of usage, the clutch throw out bearing comprises a metal enclosure for the above-described block of graphitic material, the block being supported by the enclosure and projecting from it at one side for engagement with a plane surface on an axially movable clutch releasing part.

Other objects and features of the invention will be apparent from the following description of two illustrative embodiments shown in the accompanying drawings, in which:

Figure 1 is a view, partly in side elevation and partly in vertical section, of a plate clutch embodying the invention, with its associated parts;

Figure 2 is a horizontal section through part of the clutch, showing the clutch release lever;

Figure 4 is a rear elevation of the plate clutch;

Figure 5 is a side elevation, partly broken away, showing the invention embodied in a cone clutch; and Figure 6 is a vertical section through the cone clutch release bearing.

Figure 1:
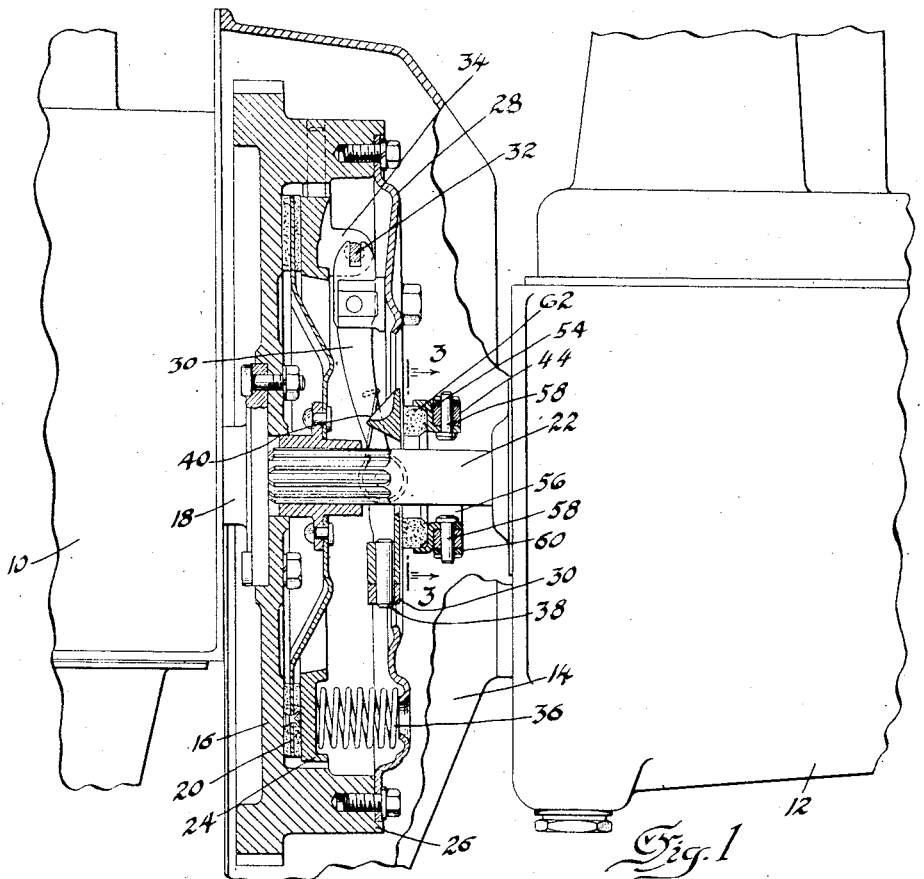
Figure 2:
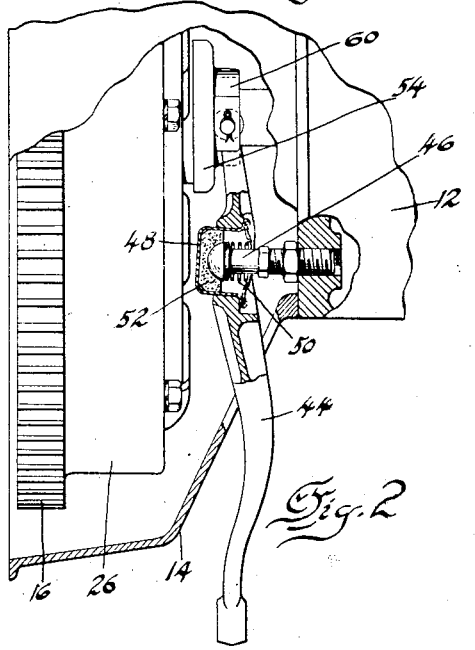
Figure 3:
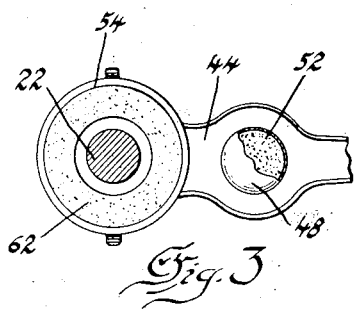
Figure 3 is a front elevation of part of the clutch release lever, showing the clutch release bearing.

In Figures 1-4 the invention is shown embodied in a plate clutch arranged to connect the engine 10 and transmission 12 of an automobile. The clutch is enclosed in a housing 14, and comprises a flywheel 16 on the crankshaft 18 of the engine, a driven plate 20 splined on a clutch shaft 22, and an annular plate or operating ring 24 rotating with the flywheel 16 but axially movable as is usual in a plate clutch. The flywheel is formed with an outer flange 26 enclosing the above described parts and carrying an end plate 28 on which are fulcrumed a series of clutch operating levers 30. According to one feature of the present invention, each lever 30 has a slotted end embracing a pin 32 carried by a boss 34 on the ring 24, so that the levers move the ring positively in both directions.

Ring 24 is normally forced toward the left in Figure 1, to engage the clutch, by a series of coil springs 36, each of which is seated at one end in a socket in the ring 24, and encircles at its opposite end a part struck up from the end plate 28. The levers 30 are connected by pivot pins 38 to a ring 40 having a plane rear face to be engaged by the clutch release or throw out bearing, an anti-rattle spring 42 for each lever being provided if desired. As shown in Figure 4 the spring 42 may be coiled about pivot pin 38 and anchored thereto, and may have an end formed to extend along the lever 30 and engage the same to hold the lever in a predetermined position.

The ring 40 is forced to the left (Figure 1) to disengage the clutch, by a pedal-operated clutch release lever 44 fulcrumed between its ends on a ball-ended post 46 by means of a metal enclosure or cup 48 fitting into an opening in the clutch-release lever and provided with a cover engaged by a take-up spring 50. The cup 48 contains a socket member 52 of permanent solid lubricant such as the graphitic material described below.

According to an important feature of the invention, the clutch release lever 44 operates the ring 40 through a clutch release or throw out bearing comprising an annular metal enclosure or backing 54 having a flange 56 pivotally connected to the forked end of lever 44 by means of pins 58. A guard 60 may be provided if desired. This enclosure 54 is provided with a rigid annular member or ring

62 projecting from its side into engagement with the plane surface of the ring 40, and consisting of permanent solid graphite lubricant.

While it is not our intention to claim in this application the process of making the bearing ring 62, it is to be recognized that this ring has certain desirable qualities which obviate the difficulties encountered in previous attempts to utilize such substances as graphite for permanent bearings, and which will be most easily recognized in considering its method of manufacture.

Accordingly, to outline this method briefly, it may be said that pure graphite, free from silica or other abrasive, and one of several well-known hydrocarbon-soluble binders, are separately ground very fine; we use petroleum pitch, the residue obtained after the paraffin has been removed in the process of petroleum distillation; the ground graphite and the ground binder are air-floated over partitions to separate out only the most finely divided particles; and the finely-divided graphite and binder are thoroughly mixed in the dry state. The mixture which may be about in the proportion of 60 parts of graphite to 40 parts of the binder is then ground with benzine, which cuts the binder and causes it to co-act with each particle of graphite, the benzine being recovered by condensation while the mixture is heated at a low heat. The mixture, thus dried, is again ground and air-floated, the finely-divided mixture thus secured being the raw material for manufacturing the clutch release bearing parts.

This powdered mixture is heavily compressed, by hydraulic pressure, in molds giving it substantially the form shown in the drawings, and, after removal from the molds, the rings so formed are heated about 400 hours at a high temperature of approximately 2300° F. After being allowed to cool slowly, they are then boiled for from 40 to 48 hours in heavy lubricating oil or grease, to impregnate them thoroughly.

The resulting bearing member 62 is a very homogeneous mass of graphite, with sufficient binder or bonding material, impregnated with oil or grease, and with a tensile strength of approximately 10,000 pounds per square inch, and a hardness as measured with the scleroscope of from 30 to 40 degrees. When run against a smooth steel surface, such as the ring 40, it operates without scoring or cutting and takes on an extremely smooth finish. It operates especially well at a unit pressure up to 130 pounds per square inch at 1000 R. P. M., and at correspondingly lower or higher pressures at other speeds. The wear under these circumstances is so small as to be barely detectable over a period of 100 hours at full load.

It will be seen that the above-described improved bearing member is supported in a novel manner so that, while graphitic solid compounds are usually so brittle and weak as not to be capable of use in an automobile, this particular member is strong enough, and is so efficiently and completely backed and supported by the metal enclosure 54, as to be good for more than the normal life of the clutch in spite of the severe shocks and jars to which it is continually subjected, while there is practically no wear in ordinary use, on account of its substantial hardness and its having a smooth bearing surface of material which is itself an efficient lubricant.

In the embodiment shown in Figures 5 and 6, this material is used as the clutch release bearing for a cone clutch comprising a flywheel 70, a cone 72, and a flange 74 having a plane front surface and which is forced to the right (Figure 5) to disengage the clutch. The clutch release bearing comprises a metal enclosure or backing 76 containing a block 78 of the above-described graphitic material projecting from its rear face into engagement with the flange 74, and pivotally connected by pintles 80 to lugs formed on a pedal-operated rock member 82. The annular enclosure 76 is in the form of a yoke having a central opening 84 for the clutch shaft 86. The annular block 78 is held by a wedge stamping 88 drawn upwardly by a small bolt 90.

While two illustrative embodiments of the invention have been described in detail, it is not our intention to limit its scope to those particular embodiments, or otherwise than by the terms of the appended claims.

We claim:

1. A self lubricating thrust throw out bearing for clutches composed of graphite carried by a suitable binder.

2. A clutch throw out bearing including graphite carried by a binder, the bearing having as characteristics, extreme hardness, great tensile strength and good heat conductivity.

3. A permanently lubricated clutch throw out bearing comprising, in combination, an annular metal enclosure formed to receive operating connections from a clutch pedal, and an annular bearing block secured in and supported by said enclosure in such a manner as to project therefrom at one side, said block consisting of a heavily compressed and highly heated mixture of graphite and a bonding material, the enclosure and block both having central openings for the clutch shaft.

4. A permanently lubricated automobile clutch throw out bearing comprising, in combination, a supporting enclosure having a central opening for the clutch shaft and arranged at opposite sides to be pivotally secured to connections from a clutch pedal, and a bearing block of solid lubricating material containing graphite supported by and projecting from one side of the enclosure and having a central opening for the clutch shaft, the solid material being of very substantial hardness to wear very slowly and having a considerable tensile strength to withstand shocks and jars without breakage when used in an automobile.

5. In a clutch, a throw out bearing mounted to receive intermittent axial thrusts and to resist relative rotary motion, said bearing composed of graphite and a suitable binder, and having as characteristics hardness, high tensile strength and good heat conductivity.

6. The invention defined by claim 5, said bearing being saturated with lubricant.

In testimony whereof we affix our signatures.

CLARENCE J. WHITACRE.
ALBERT G. GEISTERT.